Patented July 7, 1936

2,046,318

UNITED STATES PATENT OFFICE 2,046,318

SYNTHETIC RESIN

Merlin Martin Brubaker, Wilmington, Del., assignor to E. I. du Pont de Nemours & Company, Wilmington, Del., a corporation of Delaware No Drawing. Application March 21, 1933, Serial No. 662,001

12 Claims. (Cl. 134—26)

This invention relates to improved varnishes and varnish vehicles and more particularly it relates to varnishes prepared by blending drying oils and other ester-like bodies having drying properties with certain types of phenolic-formaldehyde resins having the characteristics hereinafter described.

In conventional varnish-making procedure, a natural acidic resin or ester thereof, usually rosin or ester gum, is heated with one or more drying oils until a homogeneous blend of the proper body is obtained, the mixture then being thinned with a solvent such as turpentine or mineral spirits. It has long been an object of the varnish art to substitute a synthetic resin for the rosin. The phenol-aldehyde resins, because of their great commercial importance, have received most attention for this purpose. As a result, a number of methods have been proposed for their use, such as the well known one of employing a rosin or ester gum modified phenol-aldehyde resin as the varnish gum. This is a poor substitute at best inasmuch as the final varnish still retains the inferior properties of the rosin, and the method as a whole is still dependent on a supply of natural resin. What is really desired is an unmodified phenol-aldehyde resin, but there is an outstanding property of the unmodified resins that renders them unfit for use as varnish resins, namely, the fault of being converted by heating to an infusible, insoluble body. Obviously, such resins cannot be used by the varnish trade because the resin becomes infusible and insoluble before it can be blended with the oil.

A great advance was made in U. S. Patent 1,800,296, in which it was shown that phenol-aldehyde condensation products made from a particular type of phenol could be homogeneously blended with a drying oil before becoming insoluble. The phenols specified were those having not more than two substitutable positions ortho and para to the phenolic hydroxyl group or groups. This discovery depended upon the observation that the formaldehyde resin-forming reaction was arrested by the presence of a substituent in one of the reactive ring positions of the phenol.

However, an ideal situation had not yet been attained. Varnish making is carried out for the most part by small-scale manufacturers who purchase their varnish resins and drying oils elsewhere. As the trade is conducted at present, it is highly important that the varnish resin be a stable, hard and brittle product which can be easily handled and shipped, and is always of constant composition and consistency. Unfortunately, the prior art, which shows how unmodified phenol-aldehyde condensation products might be combined successfully with drying oils, is concerned only with those phenol-aldehyde products which are non-resinous. Obviously, for the reasons given above, these non-resinous products are not suitable for the varnish trade since they are half-crystalline, mushy, oily, and of inconstant composition. The surprising discovery has now been made that all phenols having the limitations imposed by the above patent will not form hard formaldehyde resins of the type desired by the varnish trade which are compatible with drying oils and that, if compatibility is desired, further structural restrictions of the phenol are necessary. The present invention is concerned with these further restrictions and relates, therefore, in particular to stable varnish compositions consisting of a combination of a drying oil and a hard oil-soluble phenol-formaldehyde resin. Insofar as I am aware such compositions have not been disclosed heretofore.

The invention, then, has as an object the preparation of improved resins. A further object is the preparation of hard phenol-formaldehyde resins capable of being heated with drying oils and the like without becoming insoluble, capable further of forming a completely homogeneous product when heated with an oil, and capable still further of forming with the oil a product which in films does not discolor on exposure to sunlight and other atmospheric influences. Further objects are improved coating compositions and methods for their manufacture. Other objects will appear hereinafter.

These objects are accomplished by combining a drying oil, or ester body of similar drying characteristics, with the condensation product of a phenol and formaldehyde wherein the condensation is carried to the resinous stage and the phenol has the particular elements of chemical structure as outlined herein.

As a result of considerable research, I have found that there are four points to be considered in selecting a phenol suitable for making a varnish resin:

(1) The number of substitutable positions ortho and para to the phenolic hydroxyl group or groups.

(2) The ease with which these positions may be substituted (i. e. their reactivity).

(3) The nature of the substituents from the standpoint of:

(a) The solubility characteristics which they confer upon the final resin.

(b) The resistance to discoloration which they impart to the final resin.

Referring to the number of substitutable positions, it has been observed that in general phenolic bodies having three or more unsubstituted positions ortho and para to the OH group, such as phenol, m-cresol, resorcinol, p,p'dihydroxydiphenyl, and di(4 - hydroxyphenyl) dimethylmethane, react with formaldehyde to give resins which may be rapidly converted to the insoluble stage. Obviously, such resins cannot be used in the varnish industry, since heat-treatment of the oil-resin mixture results in the resin becoming insoluble. There are, however, certain exceptions to this as noted in the next paragraph. On the other hand, except possibly in rare cases (discussed below), a phenolic body having only two readily substitutable positions reacts with formaldehyde to form a resin which is capable of heat-hardening very slowly or not at all. This latter condition of only two substitutable positions, therefore, is necessary for the purpose of this invention, but is not a sufficient condition in itself since a number of the more common phenols having only two unsubstituted ortho and para positions will not form hard oil-soluble resins.

The reactivity of the unsubstituted positions ortho and para to the phenolic hydroxyl is an important feature of the phenol selected for making oil-soluble resins. For example, certain substituted phenols may possess three unsubstituted positions ortho and para to the OH, yet one of these positions may possess so low a reactivity that the heat-hardening tendency of the formaldehyde condensation products will be arrested and the resins can be combined with drying oils with some success. On the other hand, occasionally a phenol containing only two unsubstitued ortho and para positions (such as certain resorcinol derivatives) is sufficiently reactive with formaldehyde to form a resin capable of becoming insoluble under the action of heat with sufficient rapidity to restrict very decidedly the heat-treatment of the varnishes. This property must therefore be taken into account in the preparation and use of phenolic-formaldehyde condensation products as varnish resins. However, in all cases where the phenol has no more than two substitutable positions ortho and para to the phenolic OH and the substituents are of the proper nature as defined below, an oil soluble resin may be prepared from it.

In the practice of my invention, the nature of the substituents of the phenol are chosen from two standpoints: the solubility characteristics, and the resistace to discoloration which these substituents confer upon the resin. As noted above, the mere retardation of condensation is not in itself a sufficient requisite for oil-solubility; the blocking radicals which cause this retardation must, either singly or as a whole, be of such a particular nature that they render the heat-blended mixture of oil and resin completely homogenous. Assuming the condensation of the phenol with the formaldehyde is carried to the hard resinous stage (i. e. beyond the stage which yields a low molecular weight, oily, non-resinous, or half crystalline mass), many ortho and para substituted phenols still do not yield oil-soluble products, even though the formaldehyde reaction product may be miscible with the oil at the non-resinuous stage of condensation. Examples of ortho and para substituted phenols forming resins which are still not suitable (although they harden relatively slowly on heat treatment) include o- and p-cresol; o- and p-chlorophenol; p-nitrophenol; p-benzylphenol; p-hydroxybenzophenone; di(4-hydroxy,3-methylphenyl)-methane; di(4-hydroxy,3-methylphenyl) sulfone; β-acetyl rescorcinol or 1,3-dihydroxy-4-acetylbenzene; and di(4-hydroxy,3-methylphenyl)-phenylmethane. Examples of ortho and para substituted phenols forming hard oil soluble resins are di(4-hydroxy-3-methylphenyl) dimethylmethane; 4-hydroxyphenyltriethylmethane; 4-hydroxyphenyldimethylisobutylmethane; di(4-hydroxy-3-methylphenyl) methylethylmethane; di(4-hydroxy-3-chlorophenyl) propylmethane; and di(4-hydroxy-3-methylphenyl) ethylmethane.

The outstanding difference between the phenols which are unsuitable for making oil-soluble resins and those which are suitable is the difference in the number of non-benzenoid carbon atoms, the suitable phenols being characterized by the greater number. The minimum number for oil-solubility depends upon whether the phenol is mononuclear or polynuclear. If polynuclear, there should be four or more non-benzenoid carbons to produce stable oil varnishes. For example, p-hydroxybenzophenone, di(4-hydroxy-3-methylphenyl) sulfone, and di(4-hydroxy-3-methylphenyl) phenylmethane, having one, two, and three non-benzenoid carbons respectively, do not form oil-soluble resins although the resins themselves heat-harden very slowly or not at all; on the other hand, di(4-hydroxy-3-methylphenyl) methylmethane, di(4-hydroxy-3-methylphenyl) dimethylmethane, di(4 - hydroxy - 3 - methylphenyl) methylethylmethane, di(4 - hydroxy-2,3-dimethylphenyl) sulfide, 1,1-di(4-hydroxy-3-methylphenyl) cyclohexane, and 2-tertiarybutyl-4'-hydroxybenzophenone, having 4, 5, 6, 4, 8 and 5 non-benzenoid carbons respectively, all form hard, brittle, oil-soluble resins. There is, however, a peculiar exception to this rule of four non-benzenoid carbons for the polynuclear phenols. It has been found that nuclear chlorine atoms are equivalent to non-benzenoid carbons in producing oil-solubility provided the number of the latter does not fall below three. For example, di(4-hydroxy-3-chlorophenyl) dimethylmethane forms an oil-soluble resin, but di(4-hydroxy-3-chlorophenyl) methylmethane does not. Thus, it is seen that, for an oil-soluble resin, the lower limit of the non-benzenoid carbons in the case of the polynuclear phenols is set at four, and in special instances (i. e. where the phenol has one or more nuclear chlorine atoms) at three.

The mononuclear phenols are peculiarly different from the polynuclear phenols with respect to the necessary number of non-benzenoid carbons necessary to produce oil-solubility in the resin prepared therefrom. It would appear upon a preliminary evaluation of this type of phenol that the same rules hold as for polynuclear phenols, but such is not the case. For example, p-tertiary butyl and p-tertiary amyl phenols, having four and five non-benzenoid carbons respectively, form with formaldehyde hard, brittle resins, of the type desired by the varnish trade, which sometimes appear to blend homogeneously with drying oils. However, their behavior is quite erratic in this respect. It is necessary to follow a very exact procedure, such as very carefully controlled heating conditions, a very slow and cautious addition of the resin to the heated oil, etc. Even with the greatest of care, the resin frequently becomes insoluble before combining with the oil, and the process as a whole is so erratic that it is not feasible on a large scale because of the attendant danger of causing the resin to become insoluble. In the rare cases where a homogeneous blend is sometimes obtained, the varnishes are often unstable, the varnish skinning over in the container and the oil and resin eventually separating. It has now been discovered that, if the phenol has a greater number of non-benzenoid carbons than benzenoid carbons (that is, where the number of the former is seven or greater), this preponderance of aliphatic residues causes the formaldehyde resins to readily form stable, satisfactory oil varnishes. For example, 4-hydroxyphenyl-dimethylisobutylmethane, a heptyl phenol, forms a hard formaldehyde resin which, on heating with a drying oil, blends with the greatest of ease. No special or careful procedure is necessary to prevent the resin from becoming insoluble. The oil and resin are simply heated together in practically any proportion, following the heat schedules and varnish-making procedures which are in common use at present (see Example IV c). Other phenols forming hard definitely resinous bodies having this property are 4-hydroxyphenyltriethylmethane, 4-hydroxyphenyldiethylpropylmethane, 3,5-dimethyl-3-hydroxyphenylheptane and 4-hydroxyphenyldimethylbutylmethane. It is believed that this greater ease of combination with drying oils in the case of formaldehyde resins from mononuclear phenols having seven or more non-benzenoid carbons is due to two factor: (1) the greater percentage of aliphatic carbon which causes the phenol to have a greater chemical resemblance to the drying oil and (2) the resulting decreased tendency of the phenol resin to heat-harden. Mononuclear alkyl phenols such as p-tertiary butyl and p-tertiary amyl phenols, although they possess only two free positions ortho and para to the phenolic hydroxyl, still possess a sufficient reactivity with formaldehyde to restrict very decidedly the heat treatment of the varnishes. This is overcome if the aliphatic substituents constitute seven or more carbon atoms. Thus, the mononuclear phenols with which this invention is concerned must have a greater percentage of aliphatic than aromatic carbon, i. e. must have at least seven non-benzenoid carbon atoms.

In addition to the proper number of substitutable positions and the proper number of nonnuclear carbon atoms, still another limitation must be placed on the phenol which is chosen to make the varnish resin. For resistance of the resin to discoloration, the phenol should have a secondary or preferaby tertiary carbon atom attached to the ring in the ortho or preferably the para position to the phenolic OH group. Such a carbon atom may be defined as one which is directly joined to at least three carbon atoms including the nuclear carbon atom or atoms to which it is directly attached. It is believed that discoloration is due to a quinoid-like degradation of the phenol. Secondary and tertiary carbons, especially the latter, in the para position effectively block this degradation. Since ortho quinones are known (although less easily formed than the para type), the effect is also produced, but to a lesser degree, if the secondary or tertiary carbon is ortho to the phenolic hydroxyl. Resins made from the following phenols not having the requisite discoloration-resistant constitution will therefore all be found to be susceptible to yellowing on exposure to atmospheric conditions: p-hydroxydiphenyl; p,p'-dihydroxydiphenyl; 1,2,4-xylenol; 2,4-dibenzylphenol; di(4-hydroxy-3-methylphenyl) methane; 3-chloro-2-hydroxydiphenyl; and 4-hydroxy-3,5-di(3-methyl-6-hydroxybenzyl)-1-methylbenzene. On the other hand, the following phenols, all of which have a secondary or tertiary carbon atom ortho or para to the phenolic OH, form resins which are resistant to discoloration: 4-hydroxyphenyldimethylisobutylmethane, di(4-hydroxy-3-methylphenyl)dimethylmethane, and di(4-hydroxy-3-chlorophenyl)dimethylmethane.

To sum up, the three elements of chemical structure which the phenol should have are therefore as follows:

(a) In order to retard heat-hardening properties, the number of free reactive positions ortho and para to the phenolic hydroxyl, while being at least one and preferably two, shall be not more than two.

(b) In order to confer oil-solubility on the resin, these blocking substituents must constitute as a whole at least four non-benzenoid carbons in the case of the polynuclear phenols (or three non-benzenoid carbons and one or more nuclear chlorines) and at least seven non-benzenoid carbons in the case of the mononuclear phenols.

(c) In order to impart resistance to discoloration, the blocking substituents should comprise a secondary or tertiary carbon atom attached to the benzene ring in the ortho or para position to a phenolic hydroxyl. Those phenolic bodies having all the phenolic hydroxyls blocked by a para tertiary carbon are best.

Examples of phenols which fulfill all the above requirements and are therefore suitable for the purposes of this invention are as follows:

Having p-tertiary carbon di(4-hydroxy-3-methylphenyl) dimethylmethane
di(4-hydroxy-3-methylphenyl) methylethylmethane
di(4-hydroxy-3-methylphenyl) dipropylmethane
di(4-hydroxy-3-chlorophenyl) dimethylmethane
di(4-hydroxy-3-chlorophenyl) methylethylmethane
di(4-hydroxy-α-naphthyl) methylethylmethane
4-hydroxyphenyldimethylisobutylmethane
4-hydroxyphenyltriethylmethane
4-hydroxyphenyldimethylisoamylmethane
4-hydroxyphenyldiethylpropylmethane
4-hydroxyphenylethylpropylbutylmethane
3,5-dimethyl-3-hydroxyphenylheptane Having p-secondary carbon di(4-hydroxy-3-methylphenyl) ethylmethane
di(4-hydroxy-3-chlorophenyl) propylmethane
1,1-di(4-hydroxy-3-methylphenyl) cyclohexane
4-hydroxyphenylethylisobutylmethane
4-hydroxyphenylpropylisopropylmethane
4-hydroxyphenylisopropylisobutylmethane Having o-secondary or tertiary carbon di(2-hydroxy-5-methylphenyl) dimethylmethane
   di(2-hydroxy-5-methylphenyl) methylethylmethane
   di(2-hydroxy-5-chlorophenyl) dimethylmethane
   di(2-hydroxy-5-methylphenyl) methylmethane
   di(2-hydroxy-3-methylphenyl) propylmethane
   di(2-hydroxy-5-methyl-6-chlorophenyl) phenylmethane
   2-hydroxyphenyldimethylisobutylmethane
   2-hydroxyphenylisopropylisobutylmethane The three structural requirements outlined can be more clearly comprehended by reference to the following formula of a suitable polynuclear phenol:

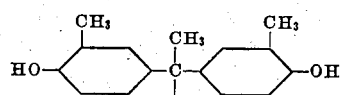

Di(4-hydroxy-3-methylphenyl)dimethylmethane

It will be seen that in this phenol there are only two unsubstituted positions ortho and para to the phenol groups; this retards the formaldehyde condensation reaction. There are five non-benzenoid carbon atoms; this gives oil solubility. There is a tertiary carbon atom para to each phenolic hydroxyl group; this gives resistance to discoloration.

A process for the production of resins is known in which phenols are first condensed with unsaturated hydrocarbons by the Koenigs method (Ber. 23, 3145; 24, 179, 3889), and then with aldehydes. However, the first reaction, which is said to furnish substituted phenols, is incomplete and the yield poor. Thus, in equimolecular quantities, phenol furnishes with diamylene only 6% of the theoretical yield, the remainder of the phenol remaining uncombined. Resins prepared from such crude phenol mixtures are unsuitable for the purposes of the present invention since the presence of an uncombined phenol which fails to meet the structural requirements prevents the realization of the improved varnishes described herein. The presence of substantial quantities, i. e. as little as 5% of uncombined phenol (i. e. hydroxybenzene), hydroquinone, resorcinol, etc., along with tertiary heptyl phenol, for example, will produce a formaldehyde resin that heat hardens before it can be combined with the drying oil. The presence of substantial quantities of other phenols, such as cresols, thymol, xylenols, etc., will produce a resin which is insoluble in drying oils and/or is not resistant to discoloration. Therefore the phenols employed in the present invention should be free from unsuitable phenols, i. e. phenols which fail to meet the structural requirements of the present invention, else the improved varnishes described herein cannot be realized.

Bearing in mind that the phenols selected should have the proper chemical structure set forth above, and that the reaction with formaldehyde is continued until definitely hard, resinous products are obtained, the following examples, in which the parts are by weight, are cited to illustrate the invention:

*Example I*

(a) *Preparation of the phenol.*—Acetone is condensed with ortho-cresol by any well known method, such as by stirring and passing in dry HCl gas at room temperature for 12 hours, to form di(4-hydroxy-3-methylphenyl) dimethylmethane. The product is purified by washing with water and recrystallization from toluol. It is important that all unchanged cresol be removed in the water washing, or, if desired, by steam distillation. The pure product melts at 136° C.

(b) *Preparation of the resin.*—Three hundred forty-six (346) parts, or 2 mols, of the di(4-hydroxy-3-methylphenyl)-dimethylmethane is mixed with 0.865 part, or 0.25% sodium hydroxide (added as a 2N solution) and 101.4 parts 37% aqueous formaldehyde (1.25 mols HCHO). The mixture is placed in a vessel fitted with a thermometer, stirrer, and reflux condenser and heated to boiling for two hours. The resin is then dried and cured for 1½ hours at 100° C. in vacuo. A hard, brittle completely clear and homogeneous resin of high melting point is obtained which can be broken up into small pieces and can be easily handled and worked with. It is soluble in acetone, alcohol, and ethoxyethanol, and to some extent in aliphatic and aromatic hydrocarbons.

(c) *Blending with the oil.*—Forty-five parts of the resin prepared as under (b) and 87.5 parts of raw China-wood oil are brought with stirring to a temperature of 200° C. over a period of 30 minutes and the mixture held at this point for 25 minutes, or until the proper body is obtained. A completely homogeneous, clear, and uniform blend is produced. The mass is then thinned while hot with a mixture of 120 parts mineral thinner and 15 parts of an aromatic hydrocarbon mixture boiling at about 125-180° C. The varnish so prepared dries to a hard, tough film in about two hours. The film is very resistant to discoloration on exposure to sunlight.

*Example II*

A varnish of different oil length than that of Example I (c) can be prepared from the resin of Example I (b) as follows: Forty parts of the resin of Example I (b) and 160 parts of raw China-wood oil are carried with stirring to a temperature of 200° C. over a period of 30 minutes, then maintained at this point for 50 minutes. The oil-resin mixture is completely clear, uniform, and homogeneous. After allowing to cool slightly, the mass is thinned with a mixture of 180 parts mineral thinner and 10 parts of aromatic hydrocarbons. To this solution is added 0.01% cobalt drier (based on the oil). The varnish thus obtained dries in about four hours to a very tough, adherent film which has excellent durability and which does not discolor.

*Example III*

(a) *Preparation of the phenol.*—Di(4-hydroxyphenyl)dimethylmethane is prepared from phenol and acetone in a manner analogous to that in which di(4-hydroxy-3-methylphenyl)dimethylmethane, was prepared in Example I. Di(4-hydroxyphenyl)dimethylmethane, having four unsubstituted positions ortho and para to the phenolic hydroxyls, reacts with formaldehyde too rapidly to give an oil soluble resin. It is therefore chlorinated by suspending in carbon tetrachloride solution and adding dropwise carbon tetrachloride saturated with chlorine, accompanied by cooling and stirring. Such a treatment gives the compound di(4-hydroxy-3-chlorophenyl)dimethylmethane, which fits all requirements for the phenols useful in making the resins.

(b) *Preparation of the resin.*—One hundred parts of the chlorine derivative above is reacted with 33.5 parts of 37% formaldehyde solution and 0.25 part of sodium hydroxide (conveniently added as a 2N solution). The reactants are heated and stirred in a closed vessel fitted with a reflux condenser, the temperature being gradually brought to 100° C. over a period of 2½ hours. The reaction mass is then neutralized with hydrochloric acid, washed with water and the water vacuum distilled. The resin so obtained has a pale reddish-brown color and is soluble in alcohol-hydrocarbon mixtures.

(c) *Preparation of the varnish.*—Forty-five parts of the resin prepared as under (b) and 87.5 parts of raw China-wood oil are carried with stirring to a temperature of 230° C. over a period of 30 minutes, then maintained at this point for 25 minutes, or until the proper body is obtained. A completely clear and homogeneous blend is produced. The viscous mass is then thinned while hot with a mixture of 115 parts mineral thinner and 10 parts aromatic hydrocarbons. The varnish so prepared dries to a hard discoloration resistant film in about 2½ hours.

Example IV (a) *Preparation of the phenol.*—Eleven hundred thirty-two (1132) parts 2,4-dimethylpentanol-3 is condensed with 980 parts phenol by heating in the presence of 1080 parts zinc chloride for seven hours at 150° C. The reaction product is diluted with water and the undissolved ZnCl₂ filtered off. The water layer is separated and the crude heptyl phenol washed with water, dissolved in alkali, acidified with hydrochloric acid, and distilled under reduced pressure. The pure product boils at about 155° C./15 mm. It has the following formula:

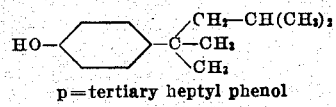

p=tertiary heptyl phenol (b) *Preparation of the resin.*—The tertiary heptyl phenol of (a) above is condensed with formaldehyde as follows: 610 parts of the heptyl phenol, 330 parts 37% aqueous formaldehyde, 4.4 parts sodium hydroxide and 17.6 parts of water are heated with stirring in an atmosphere of nitrogen for 24 hours at 90-100: C. The reaction product is acidified with 1:4 hydrochloric acid, washed with water, and dried in vacuo for 20 hours at 105° C. A hard, tough, light colored resin is obtained.

(c) *Preparation of the varnish.*—The p-tertiary heptyl phenol-formaldehyde resin of (b) above may be used as follows to make a varnish: Fifty parts of the resin and 97 parts of raw China-wood oil are heated with stirring to a temperature of 225° C. over a period of 30 minutes, maintained at this point for an additional 30 minutes. A completely homogeneous blend is produced. It is thinned while hot to 50% solids with mineral thinner and to this solution is added 0.01% cobalt drier, based on the oil. The varnish thus prepared has a low body, a pale color, and is very resistant in films to discoloration. It dries hard in about 6 hours at room temperature. This varnish is stable for long periods, remaining practically unchanged in the container for at least 14 months. As compared to resins from the p-tertiary alkyl phenols whose alkyl radicals have only four or five carbon atoms, those resins from alkyl phenols whose alkyl radicals have seven or more carbons are different in a number of respects.

The latter, for example, are much more soluble in oils, can be more readily blended therewith by heating, and the resulting varnishes are more stable. Resins from phenols having a preponderance of aliphatic carbons mix with the drying oil at lower temperatures and over a greater range of proportions of oil and resin. As previously pointed out, however, the most important distinction, the distinction which renders the lower alkyl phenol resins unfit for making varnishes on a large scale, is the tendency of the latter resins to become insoluble before being properly blended with the oil. This attendant danger of gelation of the lower alkyl phenol resins can be shown as follows: Fifty (50) parts hard tertiary-amyl-phenol-formaldehyde resin and 97 parts of raw China-wood oil were compounded in the following manner: The oil was heated to 210° C., the resin added cautiously in small portions with stirring, the temperature meanwhile being allowed to fall to 110° C. Heating was resumed when all the resin was added, the temperature being carried to 225° C. over a period of 25 minutes. The mixture foamed badly at 190° C. and after 5 minutes at 225° C. separated into gelled resin and uncombined oil. If the temperature in the above experiment is carried to only 200–210° C. over a period of 15–20 minutes and the mixture immediately removed from the fire and thinned, a homogeneous solutions may sometimes be obtained. Such a varnish, however, is quite unstable, the oil and resin soon separating in the container. If the entire amount of resin and oil are heated together simultaneously without first heating the oil, the resin gels without ever being dispersed in the oil. By reference to Example IV (c) it can be seen that p-tertiary heptylphenol resin does not show the defects of the amylphenol resin.

Instead of the 4-hydroxyphenyldimethylisobutylmethane of Example IV (a), the varnish resin may be synthesized from related phenols or mixtures thereof. As starting points for synthesizing the phenols, a number of secondary heptanols, octanols, nonanols and higher secondary alcohols are suitable. In the same way that 2,4-dimethylpentanol-3 forms 4-hydroxyphenyldimethylisobutylmethane (Example IV (a)), the following alcohols yield the indicated phenols or phenol mixtures:

| Alcohol | Phenol or phenol mixture |
|---|---|
| 2, 4-dimethylpentanol-3. | hydroxyphenyldimethylisobutylmethane |
| 2-methylhexanol-3 | hydroxyphenyldimethylbutylmethane<br>hydroxyphenylisobutylethylmethane |
| 2-methylhexanol-4 | hydroxyphenylpropylisopropylmethane<br>hydroxyphenylmethylisoamylmethane |
| 3-methylhexanol-4 | hydroxyphenylmethylethylpropylmethane<br>2-hydroxyphenyl-4-methylhexane |
| 3-ethylpentanol-2 | hydroxyphenyltriethylmethane<br>1-hydroxyphenyl-3-ethylpentane |
| 2, 5-dimethylhexanol-3. | hydroxyphenyldimethylisoamylmethane<br>hydroxyphenylisopropylisobutylmethane |
| 3, 5-dimethylheptanol-4. | 3-hydroxyphenyl-3,5-dimethylheptane |
| 3, 7-dimethylnonanol-5. | 4-hydroxyphenyl-3,7-dimethylnonane |

These phenols yield with formaldehyde hard resinous bodies of pale color which can be blended readily in wide proportions with drying oils to form stable light-resistant varnishes, according to the procedure of Example IV, parts (b) and (c).

The exact structure of a number of the above phenols has not been definitely established in all cases. In certain cases the ortho isomer is obtained as well as the para isomer (the position of the phenolic hydroxyl for this reason was not indicated in the above table). Also, inasmuch as the reaction through which the phenol is formed from the alcohol may often proceed in two ways, a mixture of two phenols is frequently obtained; this is indicated in the above table. This detracts in no way from the highly advantageous properties of the resins and the varnishes derived therefrom. For the best results, however, the mixture of phenols chosen for synthesizing the varnish resin should not contain any phenol which fails to meet the structural requirements for resistance to discoloration; that is, all phenols in the mixture should contain an ortho or para secondary or tertiary carbon atom. For example, propylisopropylcarbinol, when condensed with phenol as in Example IV (a), probably yields a mixture of hydroxyphenyldimethylbutylmethane and hydroxyphenylethylisobutylmethane; this mixture is quite suitable for making the varnish resin, although it is somewhat less desirable from the standpoint of discoloration than a single phenol having a p-tertiary carbon or a mixture of phenols having only p-tertiary carbons. On the other hand, 3-ethylpentanol-2 probably yields with phenol a mixture of 4-hydroxyphenyltriethylmethane and 1-hydroxyphenyl-3-ethylpentane; this mixture is undesirable for making a discoloration resistant varnish resin since the latter phenol fails to meet the structural requirements.

The drying component of the varnish, as shown by the following examples, is not confined to China-wood oil.

Example V

A linseed oil varnish can be prepared from the resin of Example I (b) as follows: Forty-five parts of the resin prepared as in Example I (b) and 87.5 parts raw linseed oil are carried with stirring to a temperature of 230° C. over a period of 30 to 35 minutes, then maintained at this point for 15 minutes. The clear and homogeneous product is thinned while hot with a mixture of 105 parts of mineral thinner and 25 parts of aromatic hydrocarbons. To this solution is added 0.05% cobalt drier on the basis of the oil. The varnish thus prepared dries tack-free to a light resistant film after about 8 hours.

Example VI

Frequently it is advantageous to use a mixture of drying oils in the preparation of the varnishes. This example illustrates such a mixture: Forty-five (45) parts of the resin prepared as in Example I (b), 44 parts raw China-wood oil, and 44 parts raw linseed oil are carried with stirring to a temperature of 190° C. over a period of 20 minutes, then maintained at this point for about 45 minutes. The clear, homogeneously blended product is thinned while hot with a mixture of 112 parts of mineral thinner and 13 parts of aromatic hydrocarbons. To the light colored solution thus obtained is added about 0.03% cobalt drier on the basis of the oil. This varnish has a viscosity of about 2.0 seconds in the Gardner-Holt tube and dries to the tack-free stage in about five hours. The film is very resistant to light.

The ester-like bodies previously referred to which are ingredients of my composition are preferably drying oils such as linseed, China wood oil, etc. but also includes polyhydric alcohol-polybasic acid resins modified by drying oils or drying oil acids. These ester-like bodies may be defined as polyhydric alcohol esters of drying oil acids. This includes esters in which the acids are exclusively drying oil acids as well as esters in which a part of the drying oil acid has been replaced by a polybasic organic acid. In general these ester-like bodies are characterized by their ability to dry, as films, by absorption of oxygen from the atmosphere. In the manufacture of oleoresinous varnishes it is necessary that one or more of the varnish components have such a property.

In the following example the phenolic-formaldehyde resin is combined with an oil modified polyhydric alcohol-polybasic acid resin. The varnishes obtained with such ester-like bodies usually dry more slowly than those from the oil alone; for this reason they are more suitable for baking varnishes.

Example VII (a) *Preparation of the polyhydric alcohol-polybasic acid resin.*—One hundred parts China-wood oil and 10 parts glycerol are heated with 0.2 part sodium hydroxide, the temperature being carried to 225° C. with stirring over a period of 45 minutes and then maintained at this point for 15 minutes. To this mixture, which has been allowed to cool to about 180° C., is added 23.1 parts phthalic anhydride. Heating is then continued to resinification, about 1½ hours at 225° C. being necessary. Similar resins can be prepared from other polycarboxylic acids such as adipic, sebacic, dilactylic, maleic, diphenic, tetrahydrophthalic, quinolinic, etc. and other polyhydric alcohols such as ethylene glycol, diethylene glycol, pentaerythritol, monoethylin, etc. As modifying ingredients in addition to the drying oils or drying oil acids, there may be employed natural resins, such as rosin, kauri, and Congo; ester gums; monocarboxylic acids other than drying oil acids, such as butyric, oleic, stearic, salicylic, benzoic, and semi- and non-drying oil acids; and monohydric alcohols such as amyl, ethoxyethyl, dodecyl, benzyl, and cyclohexyl. These other polyhydric alcohol-polybasic acid resins are also suitable for the purposes of this invention.

(b) *Blending with the phenol-aldehyde resin.*—Ninety-seven parts of the oil modified polyhydric alcohol-polybasic acid resin prepared under (a) above and 33.5 parts of the resin prepared in Example I (b) are carried with stirring to 160° C. over a period of 20 minutes, then to 190° C. over a period of 15 minutes, the temperature being maintained at the latter point for about 5 minutes. The smoothly blended mixture is thinned while hot with 105 parts mineral thinner and 20 parts aromatic hydrocarbons. The resulting varnish solution is light in color, has a moderately heavy body and dries to a film which is slightly hazy but does not discolor on exposure to sunlight over long periods of time.

Instead of using an oil-modified polyhydric alcohol-polybasic acid resin alone, the phenol-formaldehyde resin may be blended with a mixture of a drying oil and a drying oil modified polyhydric alcohol-polybasic acid resin as in the following example:

Example VIII

Forty-five parts of the resin prepared under Example VII (a), 40.5 parts of the resin prepared under Example I (b), and 47 parts of raw China-wood oil are heated with stirring to a temperature of 190° C. over a period of 30 minutes, maintained at this point for about 10 minutes, and then thinned while hot with a mixture of 105 parts of mineral thinner and 20 parts of aromatic hydrocarbons. This varnish solution is also rather heavy in body but is light in color. It dries to a slightly hazy film which nevertheless is resistant to sunlight. Cobalt drier and baking accelerates the drying without any deleterious effect on the light-resistant properties.

Referring generally to the methods used in preparing the phenol resin and blending it with oil, it may be stated in discussing the preparation of the resins broadly that I have ascertained that a proportion of about 1.5 to 2.0 mols of formaldehyde to one mol. of the phenol usually gives the best results as regards oil solubility. Although both acid and alkaline catalysts may be used, the latter have been found to give more consistent results; the amount of alkali used for best results falls in the range 0.2–0.4% by weight, based on the phenol, although quantities outside this range are by no means precluded. The heat treatment should vary with the nature of the phenol, the nature and amount of the catalyst, and the proportions of the phenol and the formaldehyde. Two to three hours refluxing at 100° C. gives good results with the resin of Example I, but a longer heat treatment is necessary, for example, with the resin of Example IV, in which a different phenol is used. A phenol having but one reactive position requires more drastic heat treatment in resin formation than does one having two reactive positions. With regard to the catalyst, the greater the amount, the more rapid the reaction. If a greater proportion of formaldehyde is used the time and temperature of heating can be decreased, although there are limits here for best results.

Formaldhyde may be replaced wholly or in part by hexamethylenetetramine, methylene chloride, methylal, paraformaldehyde, etc. Of these formaldehyde and its polymers are preferred since hexamethylenetetramine leads to more highly colored resins and the use of methylene chloride, acetaldehyde, benzaldehyde, etc. requires more care and skill to obtain good resins. Chlorinated phenols, for example the phenol prepared under Example III (a), can be heated for a longer period of time with the formaldehyde for any given proportion of catalyst and formaldehyde.

The method used in blending the resin with the oil is, generally speaking, the method followed in standard varnish making procedure and depends for the most part on the nature and amount of the oil. For 25 gallon China-wood oil varnishes, the mixture of oil and resin is carried to a temperature of 160–230° C. over a period of 30–40 minutes, then held in this range for 10–30 minutes or until the proper body is obtained. The solvent mixture for thinning the varnish generally should contain from 85–95% aliphatic hydrocarbons and from 5–15% aromatic hydrocarbons. The drier can be added to the hot or cold solution. The amount of the latter necessary generally falls in the range 0.01% to 0.1% on the basis of the oil, the best amount being determined by simple experiment. For the preparation of 50 gallon China-wood oil varnishes (50 gallons China-wood oil per 100 pounds of resin) the oil and resin are carried to 200–250° C. over a period of 30 minutes, then held at this point for 30–50 minutes or until the proper "string" is obtained. With these longer oil varnishes less aromatic hydrocarbons are necessary in the solvent mixture. For linseed oil-China-wood oil mixtures, and particularly for linseed oil alone, a more stringent heat treatment of the oil-resin mixture is necessary, temperatures frequently running up to 265° C. being necessary before the proper body can be obtained. For the preparation of varnishes from the phenol resin and the oil modified polyhydric alcohol-polybasic acid resins, the temperature cannot be carried so high because of the resulting danger of gelation of the polyhydric alcohol-polybasic acid resin. A generally suitable schedule is 20–30 minutes up to 190–195° C. and 5–20 minutes at 190° C.

In the preparation of the phenol intermediate any of the generally suitable synthetic methods known from the literature which give pure products may be followed. In order fully to realize the advantage of the invention, it is important that the phenol selected for making the varnish resin be free from phenols not having the particular elements of chemical structure explained herein. In preparing the alkyl-phenols, phenol can be heated with the secondary alcohol in the presence of a dehydrating agent, e. g., zinc chloride, or the phenol can be heated with an aliphatic halide in the presence of an acid acceptor. In preparing the polynuclear phenols, such as di(4 - hydroxy - 3 - methylphenyl) dimethylmethane, o-cresol, for example, can be treated with the ketone or higher aliphatic aldehyde at a comparatively low temperature (25–50° C.) in the presence of dry hydrogen chloride or sulfuric acid, and unchanged cresol removed by washing or steam distillation. In one respect, the polynuclear phenols are more desirable than the mononuclear alkyl phenols in which the alkyl residues comprise seven or more carbons since the former yield formaldehyde resins which are harder and more easily handled, are more adapted to the requirements of the varnish trade, and which produce faster-drying varnishes. Di(4-hydroxy - 3 - methylphenyl) dimethylmethane for example is better in this respect than a secondary or tertiary octyl phenol. Also, as previously explained, those polynuclear phenols containing nuclear chlorine atoms probably represent the best types from the standpoint of miscibility with the oil, provided the phenol also contains no less than 3 non-benzenoid carbons. For example, di(4 - hydroxy - 3 - chlorophenyl) dimethylmethane, having only three non-benzenoid carbons, forms a resin with formaldehyde which is readily soluble in drying oils. From the standpoint of discoloration those phenols having the phenolic hydroxyl groups blocked in the para positions by a tertiary carbon atom are better than those having the phenolic hydroxyls blocked with a secondary carbon atom. For example, di(4-hydroxy-3-methylphenyl) dimethylmethane is a better phenol from the standpoint of discoloration than is di(4 - hydroxy - 3 - methylphenyl) propylmethane. Again, from the standpoint of discoloration, the blocking substituent which contains the secondary or tertiary carbon should be in the para position to the phenolic hydroxyl or hydroxyls rather than the ortho position. For example, di(2 - hydroxy - 5 - methylphenyl) dimethylmethane resin is less resistant to discoloration than is di(4-hydroxy-3-methylphenyl) - dimethylmethane resin; likewise 2-hydroxyphenyldimethylisobutylmethane resin discolors more than that from 4-hydroxyphenyldimethylisobutylmethane. However, resins from phenols having the ortho position blocked rather than the para, and/or having a secondary rather than a tertiary blocking carbon atom, still represent a distinct improvement over those not so constituted, and therefore form a part (though not a preferred part) of the present invention.

The most useful property of the resins described herein is as synthetic varnish gums. This property depends upon their ability to combine homogeneously with ester-like bodies having drying properties, particularly drying oils, to form varnish vehicles which are highly durable and resistant to discoloration. However, there are other combinations which are useful in the coating, plastic, impregnation and other arts. The resins synthesized from formaldehyde (in one of its various forms) and phenols having the particular chemical structure outlined can be blended by heating, by mutual solvents, or by other means with one or more of the following, with or without the ester-like body having drying properties: cellulose derivatives, such as nitrocellulose, cellulose acetate, benzyl cellulose and ethyl cellulose; natural resins and ester gums such as rosin, kauri, copals, and rosin glyceride; other synthetic resins or resin-forming material, such as meta styrene, coumaroneindene resins, amine-aldehyde resins, acrylic ester resins, vinyl resins, casein plastics, and polyhydric alcohol-polybasic acid resins not modified by drying oils or drying oil acids; bitumens, such as asphalts; natural or synthetic waxes, such as beeswax, candelilla wax, Montan wax, carnauba wax, and lauryl stearate; and other ester-like bodies, such as stearin, castor oil, hydrogenated castor oil, tricresyl phosphate, dibutyl phthalate, triethylin, animal fats and waxes, and the like. To the products, blended with drying oils and/or one or more of the above substances, there may be added pigments, solvents, plasticizers, antioxidants, fillers, lakes, etc., as needed and desired, in accordance with methods known to the art.

In addition to the particular use as coating compositions, any of the combinations or mixtures in the above paragraph may be used as molding plastics; impregnating and coating agents for paper, wood, cloth, porous stone, cellophane, rubberized fabrics, etc.; as the sandwiching material or adhesive therefor in the manufacture of shatter-proof glass; as linoleum plastics for the manufacture of floor coverings; as adhesives, cements, and sealing waxes for general use; and as binding agents for mica, asbestos, and the like in the manufacture of insulating materials, or for cellulose acetate and other cellulose derivatives in the manufacture of laminated sheet and tube products.

It will be apparent that my discovery that those phenols defined in terms of chemical structure as outlined herein yield oil-soluble resins is a valuable contribution to the art in view of the fact that all phenolic materials having not more than two unsubstituted reactive positions, do not yield the hard oil-soluble resins which are desired by the varnish trade, it having previously been assumed that in order to obtain an oil-soluble product it was necessary in all instances to stop the condensation reaction at the non-resinous stage. Furthermore, I have also pointed out an element of chemical structure upon which to select the phenol upon the basis of resistance to discoloration in the varnish film.

As many apparently widely different embodiments of this invention may be made without departing from the spirit and scope thereof, it is to be understood that I do not limit myself to the specific embodiments thereof except as defined in the following claims.

I claim:

1. A composition of matter comprising a polyhydric alcohol ester of drying oil acid and a resinous condensation product of formaldehyde with a mononuclear phenol characterized by having at least one but not more than two free reactive positions and having at least seven non-benzenoid carbon atoms, one of which is directly joined to at least three carbon atoms and is directly joined to the benzene ring in one of the ortho and para positions directed by a phenolic hydroxyl group, said phenol being substantially free from phenols not so characterized.

2. A composition of matter comprising a drying oil and a resinous condensation product of formaldehyde with a mononuclear phenol characterized by having at least one but not more than two free reactive positions and having at least seven non-benzenoid carbon atoms, one of which is directly joined to at least three carbon atoms and is directly joined to the benzene ring in one of the ortho and para positions directed by a phenolic hydroxyl group, said phenol being substantially free from phenols not so characterized.

3. A composition of matter comprising a drying oil and a resinous condensation product of formaldehyde with a mononuclear phenol characterized by having at least one but not more than two free reactive positions and having at least seven non-benzenoid carbon atoms, one of which is directly joined to at least three carbon atoms and is directly joined to the benzene ring in the para position to a phenolic hydroxyl, said phenol being substantially free from phenols not so characterized.

4. A composition of matter comprising a drying oil and a resinous condensation product of formaldehyde with a mononuclear phenol characterized by having at least one but not more than two free reactive positions and having at least seven non-benzenoid carbon atoms, one of which is directly joined to at least four carbon atoms and is directly joined to the benzene ring in the para position to a phenolic hydroxyl, said phenol being substantially free from phenols not so characterized.

5. A composition of matter comprising China-wood oil and a resinous condensation product of formaldehyde with a mononuclear phenol characterized by having at least one but not more than two free reactive positions and having at least seven non-benzenoid carbon atoms, one of which is directly joined to at least four carbon atoms and is directly joined to the benzene ring in the para position to a phenolic hydroxyl, said phenol being substantially free from phenols not so characterized.

6. The composition of matter set forth in claim 10 in which said phenol is 4-hydroxyphenyldimethylisobutylmethane.

7. A resinous reaction product of formaldehyde and a phenol of the general formula R—$C_6H_4OH$, where R is a forked carbon chain alkyl radical of at least seven carbon atoms, the alkyl radical occupying one of the reactive positions to the phenolic hydroxyl.

8. The composition set forth in claim 1 in which said ester is the resinous polyhydric alcohol ester of a mixture of drying oil acid and polybasic acid.

9. A composition of matter comprising an oil modified polyhydric alcohol-polybasic acid resin and a resinous condensation product of formaldehyde with a mononuclear phenol characterized by having at least one but not more than two free reactive positions and having at least seven non-benzenoid carbon atoms, one of which is directly joined to at least four carbon atoms and is directly joined to the benzene ring in the para position to a phenolic hydroxyl, said phenol being substantially free from phenols not so characterized, said oil modified resin being a polyhydric alcohol ester of drying oil acid and polybasic acid.

10. The composition set forth in claim 9 in which said oil modified resin is a polyhydric alcohol ester of China-wood oil acids and polybasic acid.

11. A composition of matter comprising an oil modified polyhydric alcohol-polybasic acid resin and the resinous condensation product of formaldehyde with 4-hydroxyphenyldimethylisobutylmethane, said oil modified resin being a polyhydric alcohol ester of China-wood oil acids and polybasic acid.

12. The composition set forth in claim 7 in which said phenol is 4-hydroxyphenyldimethylisobutylmethane.

MERLIN MARTIN BRUBAKER.

CERTIFICATE OF CORRECTION.

Patent No. 2,046,318.                                July 7, 1936.

MERLIN MARTIN BRUBAKER.

It is hereby certified that error appears in the printed specification of the above numbered patent requiring correction as follows: Page 2, first column, line 59, for "resistace" read resistance, and second column, line 9, for "rescorcinol" read resorcinol; page 3, first column, line 38-39, for "factor" read factors; page 5, second column, line 30, for "solutions" read solution; page 7, first column, line 39, for "Formaldhyde" read Formaldehyde; page 8, second column, line 61, claim 6, for the claim reference numeral "10" read 5; and that the said Letters Patent should be read with these corrections therein that the same may conform to the record of the case in the Patent Office.

Signed and sealed this 3rd day of November, A. D. 1936.

(Seal)                                Henry Van Arsdale
                                     Acting Commissioner of Patents.